Dec. 24, 1968        T. H. HILLS        3,417,687
AUTOMATIC FILM PROCESSING APPARATUS
Filed Nov. 17, 1965        4 Sheets-Sheet 1

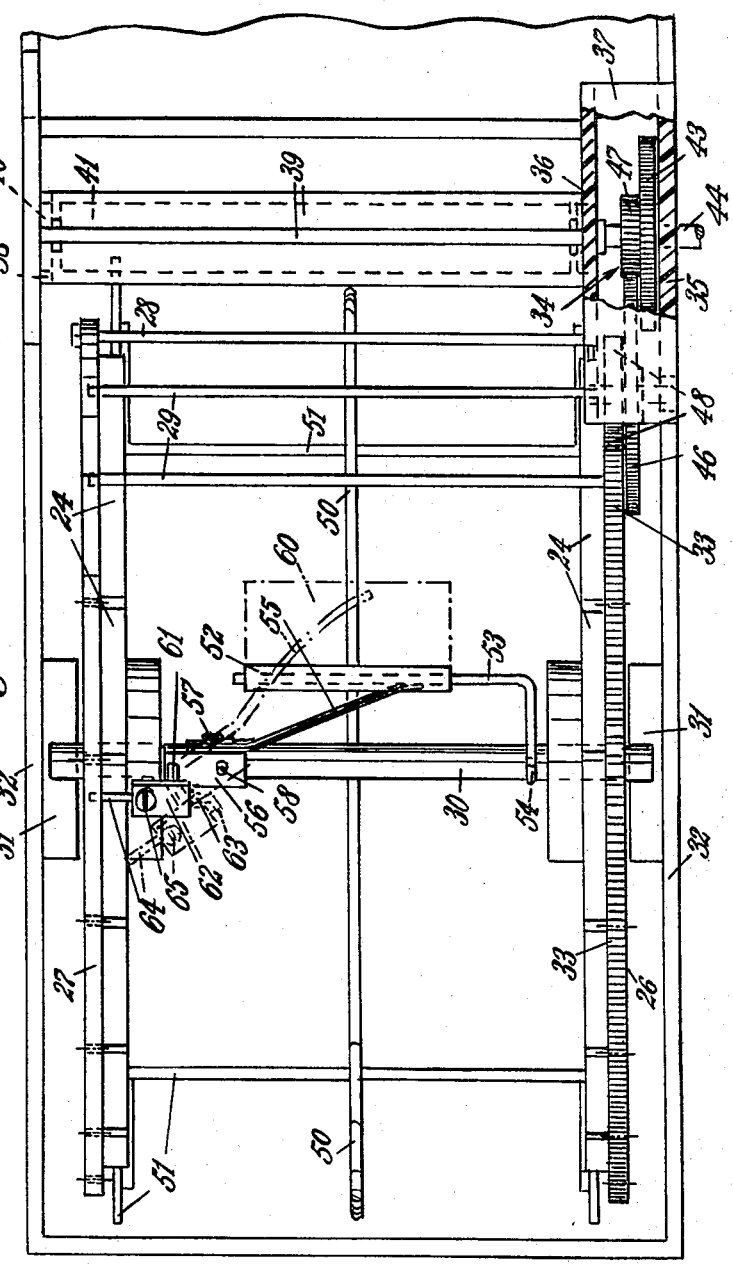

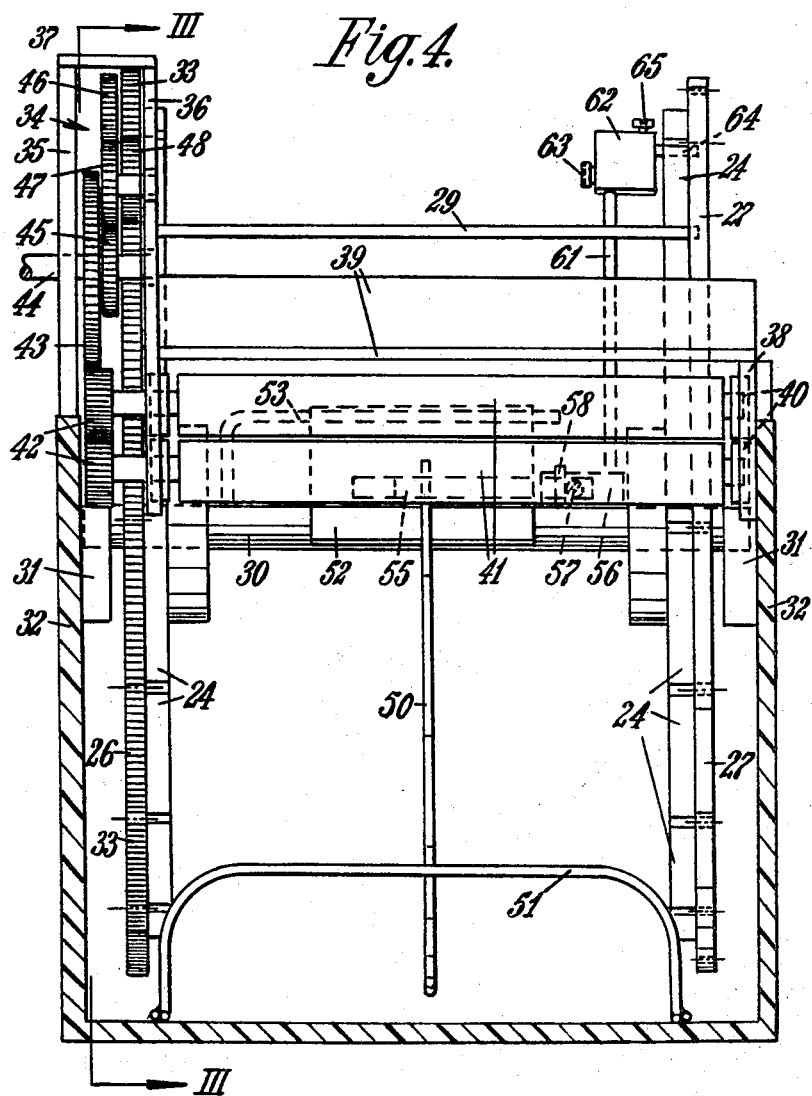

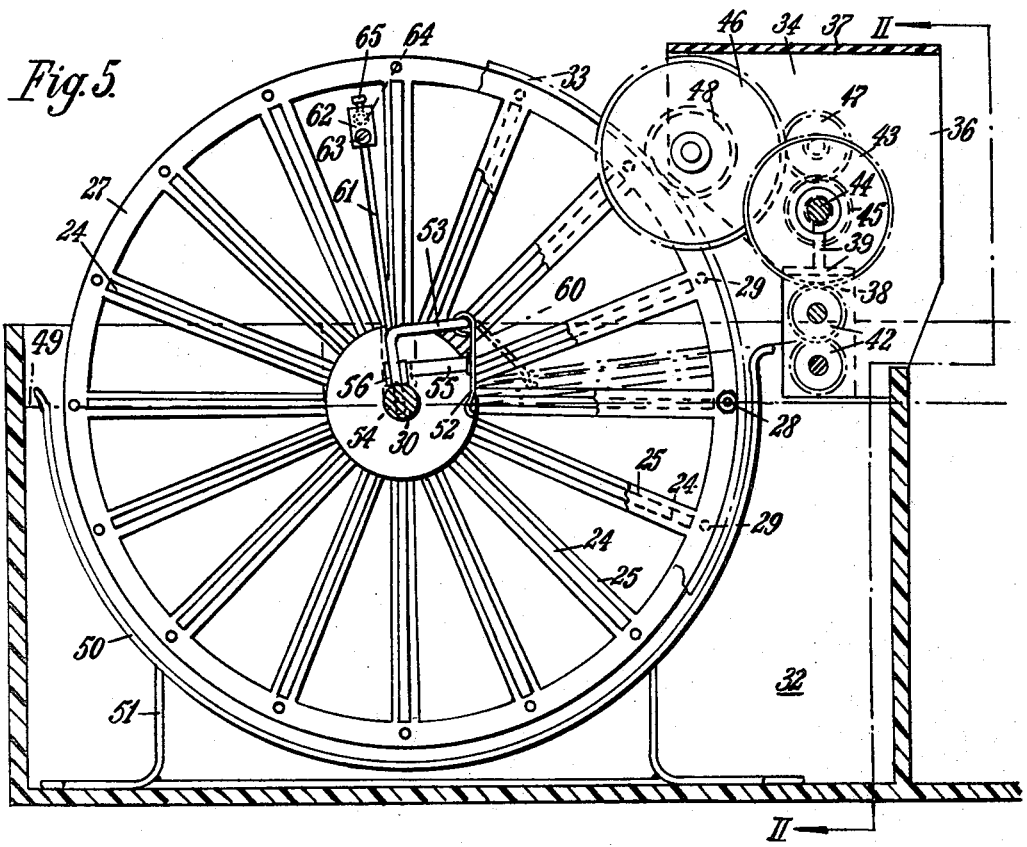

3,417,687
AUTOMATIC FILM PROCESSING APPARATUS
Thomas Henry Hills, Church Hill House, Church Hill,
Merstham, Redhill, Surrey, England
Filed Nov. 17, 1965, Ser. No. 508,245
Claims priority, application Great Britain, Nov. 25, 1964,
47,885/64
10 Claims. (Cl. 95—93)

ABSTRACT OF THE DISCLOSURE

A transport device for cut photographic film in a processing apparatus consisting of a rotatable paddle wheel, for each of a plurality of stages in the process, for receiving a flat portion of cut film between adjacent paddles, a pair of rollers associated with each paddle wheel for receiving each portion of film from the associated paddle wheel, and transferring the film to the paddle wheel in the next following container. Each paddle wheel is provided with a member for pushing each portion of film radially outwards with respect to the axis of rotation of the paddle wheel, so as to cause the outside edge of the film to enter the pinch of the associated pair of rollers.

---

The invention relates to automatic film processing apparatus, and in particular to transport means for film in such apparatus.

It is known to provide automatic film processing apparatus for what is known as "cut film" in which the portions of films are kept in motion through the chemical baths by a system of rollers, some of which are submerged in the processing solutions. It is desirable, however, that the film material should be touched as little as possible during its transport through the apparatus, and it is the object of the present invention to provide an improved transport means for "cut film" in such apparatus.

The apparatus hereinafter described is particularly suitable for use in the processing of 100 mm. square film which is used for the routine X-ray of chests, etc., but it is also able to handle films of much smaller dimensions e.g. 35 mm. cut lengths of film as well as of larger dimensions. The film does not require to be mounted in any form of carrier, holder or frame during processing, and despite this transports the film rapidly from chemical bath to chemical bath with the minimum damage to the film material and with the maximum conservation of the procesing reagents.

The invention consists in transport means for cut photographic film in a processing apparatus comprising a rotatable paddle wheel for each of a plurality of stages in the process, and adapted to receive a portion of cut film between adjacent paddles and to support and convey the film through a container, and a pair of rollers associated with each paddle wheel adapted to receive each portion of film from its paddle wheel at the completion of its movement through said container and to transfer the film to the paddle wheel of the next following container, each paddle wheel being provided with means for moving each portion of film in a radial direction of the paddle wheel at or towards the end of said movement through said container to cause the edge of said film to enter the pinch of said pair of rollers.

The invention further consists in transport means as set forth in the preceding paragraph in which at least one of the containers is adapted to contain a processing liquid, and the paddle wheel is mounted for rotation about a horizontal axis adjacent the surface of said liquid, while an arcuate fixed guard rail is provided below the paddle wheel to retain the portions of film between the paddles of the paddle wheels under the axis of rotation of the wheel as the film is carried through the liquid.

The invention still further consists in transport means as set forth above in which at least one of the containers forms part of a film drying stage.

Figure 2:
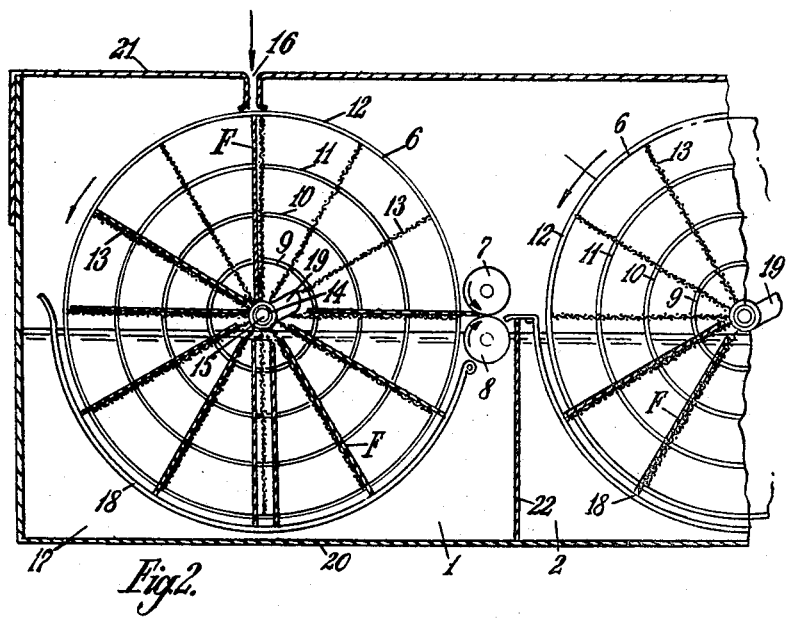
Figure 1:
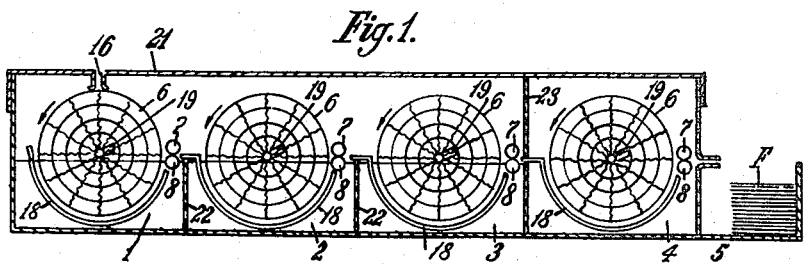

The accompanying drawing shows, by way of example only, two embodiments of the invention in which FIGURE 1 shows diagrammatically a processing apparatus having four paddle wheels, FIGURE 2 shows in part section part elevation a portion of the tank of FIGURE 1, FIGURE 3 is a plan view of alternative transport means, FIGURE 4 is a part cross section part elevation on the line II—II of FIGURE 5, while, FIGURE 5 is a part longitudinal section part elevation on the line III—III of FIGURE 4.

The apparatus shown in FIGURE 1 comprises five stages, a developing tank 1, a fixing tank 2, a washing tank 3, a drying compartment 4 and stacking space 5, stages 1–4 each being provided with a paddle wheel 6 and a pair of rollers 7 and 8.

Each paddle wheel 6, see also FIGURE 2, comprises two circular ends formed of stainless steel rings 9–12 fastened to the wire mesh paddles 13 positioned radially between the ends. The paddles may be spot welded to the rings of the ends and thus form a rigid structure. The inner corners of the paddles are fixed to tubular members 14 each side positioned upon a fixed axle 15, and which allow the paddle to rotate freely thereon.

The paddle wheels are provided with means, not shown, by which they are all rotated slowly in an anticlockwise direction as viewed in the figures, which, for example, may be an inter-engaging train of gears, or a system of belts and pulleys or friction wheels driven by an electric motor.

The exposed portion of film material F, for example from a 100 mm. Odelca camera is fed directly into the top of the processing tank by way of the inlet slit 16 and falls in between the paddles 13 and is carried round as the paddle rotates and becomes immersed in the liquid 17 as it passes under the axis 15.

To prevent each portion of film from falling out from between the paddles below the axle 15 there are provided arcuate guard rails 18 upon which the edge of each portion of film rests.

As each portion of film is lifted on its paddle towards the surface of the liquid the inner edge of the film engages a cam like member 19 attached to the fixed axle, which moves the film radially outwards until the outer edge engages in the pinch of the pair of rollers 7 and 8, which are driven at such a speed as quickly remove the film from the associated paddle wheel and insert it between the paddles of the next paddle wheel.

The rollers may be of rubber or plastic and serve to remove some of the surface chemicals from the film while transporting the film from one stage to the next. By this means the portion of film is carried through each stage, of which one may be a drying compartment 4 provided with a current of warm air, and finally deposited in the stacking space 5.

When the period to be occupied in passing through each stage is the same the paddle wheels may be of the same size, have the same number of paddles and be rotated at the same speed, but when the period to be occupied in passing through the stages is different, the paddle wheels may be of different diameters and have different numbers of paddles so that at the instant of transport from paddle wheel to paddle wheel by the rollers, the paddles of the respective wheel are correctly aligned with one another.

The transport apparatus can conveniently be enclosed in a light tight box 20 having a removable lid 21 so as to provide access to the tanks to replace the chemicals and remove the paddles for cleaning. The box 20 may be provided with partitions 22 for dividing it into different tanks and a wall 23 for separating the tanks from the drying compartment 4. By this means a very compact and easily transportable processing apparatus is provided in which the portions of film are but lightly supported while in the processing liquids and the chemicals can gain access to all parts of the film.

It is proposed in the constructed illustrated in FIGURES 1 and 2 to provide rigid cam members fastened to the axle; alternatively it is proposed to provide strip springs, bent in a curve of similar or alternative form, which being resilient allow the cam face to accommodate itself to the positioning of the cut film as it comes into contact therewith, and thereafter, by reason of its resilience, assists in the urging of the film into the pinch of the rollers.

The paddle wheel of the embodiment shown in FIGURES 3 to 5 is in skelton form in as much as the paddles comprise only flanges 24 upon the spokes 25 which support the cut film along its opposite edges, and thus provides unobstructed contact of the emulsion on the film with the processing liquid all over the film.

The paddle wheel is formed of two separate spoked wheels 26 and 27 of synthetic resin joined by stainless steel rods 28 provided with nuts and intermediate spacer rods 29 engaging in blind bores in the wheels. The wheels are rotatable on a fixed shaft 30 which rests at its ends in U-shaped blocks 31 fastened to or formed as part of the sides 32 of the container. The ends of the shaft 30 are flattened to prevent rotation and it together with the paddle wheel may be lifted out of the container for cleaning.

Spoked wheel 26 is provided with circumferential teeth 33 by which the paddle wheel is rotated by an electric motor, not shown, by way of a gear box 34 which is also detachable for cleaning. The gear box has two parallel plates 35 and 36, which support the bearings for the gear wheels, and a top 37, to one side of which the plate 38 is attached by means of the T-shaped member 39 the plate 38 carrying the bearings 40 for the shafts of the two soft rubber covered rollers 41.

The shafts of these rollers pass into the gear box 34 and are provided with inter-engaging pinions 42 the upper one of which is driven by the large pinion 43 on the drive shaft 44. Also attached to the drive shaft 44 is the small pinion 45 which drives the large pinion 46 by way of the intermediate pinion 47. On the same shaft as the large pinion 46 is a small pinion 48 which engages the circumferential teeth 33 on the wheel 26.

The paddle wheels and gearing are the same for each compartment and the drive shaft 44 of each of them is provided with a sprocket wheel, not shown, which engages with the upper side of the upper horizontal run of a sprocket chain also not shown, driven by a common electric motor, which thus allows each gear box to be lifted up for removal for cleaning, and which when replaced allows the teeth of the sprocket wheel to engage downwardly into the recesses in the sprocket chain.

The speed of rotation of the motor and the ratio of the gearing are so chosen that the passage of the film through the liquid takes the appropriate time for processing to take place. When the paddle wheels are replaced after cleaning they are all turned to the same position before the sprocket wheel is engaged with the chain, to ensure that all the paddle wheels rotate in synchronism.

The paddle wheel rotates anti-clockwise as viewed in FIGURE 5 so that when the film is deposited either vertically or at an angle into the space between spokes it rests upon flanges 24, and is carried firstly downwards to enter the surface 49 of the liquid, and then as it travels downwards it slides radially outwards along the flange 24 until its edge rests upon the guard rail 50 supported on the wire frame 51 on the bottom of the container.

In order to move the film into the pinch between the rollers 41 after it has emerged from the liquid there is provided the hinged flap 52 hung from the cranked rod 53 one end of which is screwed in a bore 54 in the fixed shaft 30.

A leaf spring type lever 55 attached to block 56 by the screw 57 rests at its free end against the back of the flap 52 the block being rotatably supported upon a pin 58 on the shaft 30, and in consequence, when the block is rotated to the position indicated by the chain dotted line 59, the flap is pushed out to the position indicated by the chain dotted line 60 and the film is pushed at the appropriate moment in contact with the rollers.

The rollers take over the film and pass it into the space between the spokes of the following paddle wheel, where the same cycle of operation takes place, or if it is the last paddle wheel, it delivers the film to a stack.

The block 56 has a bore in which is fastened the upstanding rod 61, to the top of which a further block 62 is fastened, by the screw 63 and which carries a horizontal short rod 64 held by the screw 65, which is engaged by each flange 24 in turn as the paddle wheel rotates. This acts to pivot the block 56 about the pin 58 and so operate the flap 52. The extent of movement of the flap 52 can be varied by changing the position of the block 62 on the rod 61.

It is proposed to add developer and fixer to the appropriate tanks in a volume proportional to the number of films processed, and for this purpose the films leaving the drying compartment may be caused to interrupt light passing to a photocell, which, by means of an electronic circuit, operates a solenoid which releases the chemical solutions. Other means for achieving the same object may be used alternatively.

The apparatus is primarily intended for the processing of X-ray film, but of course is suitable also for developing films of other types including colour films negative and positive by the provision of a suitable number of stages and allowing for the desired period of immersion of the film in each container.

It is preferable to make the parts of the apparatus either in a suitable synthetic resin or in stainless steel so as to resist corrosion by the processing liquids and for ease of cleaning.

It is to be understood that the above description is by way of example only, and that details for carrying the invention into effect may be varied without departing from the scope of the invention.

I claim:

1. Transport means for cut photographic film in a processing apparatus, comprising a rotatable paddle wheel for each of a plurality of stages in the process, adapted to receive a portion of cut film between adjacent paddles so that each piece of film is carried between adjacent vanes of the paddle wheel and to support and convey the film through a container, a pair of rollers associated with each paddle wheel and adapted to receive each portion of film from its paddle wheel at the completion of its movement through said container and to transfer the film to a paddle wheel in a next following container; each paddle wheel being provided with film displacement means adapted to push each portion of film radially outwards along the vane on which it is carried towards the end of its movement through said container so as to cause the outer edge of said film to enter the pinch of said pair of rollers.

2. Transport means as claimed in claim 1 in which at least one of the containers is adapted to contain a processing liquid, and the paddle wheel is mounted for rotation about a horizontal axis adjacent the surface of the liquid, while an arcuate fixed guard rail is provided below the paddle wheel to retain the portions of film between the paddles of the paddle wheel under the axis of rotation of the wheel as the film is carried through the liquid.

3. Transport means as claimed in claim 1 in which at least one of the containers forms part of a film drying stage.

4. Transport means as claimed in claim 1 in which the means for moving each portion of film radially is a cam like member fixed close to the axis of rotation of the paddle wheel which engages the inner edge of the film as it comes round.

5. Transport means as claimed in claim 1 in which the means for moving each portion of film radially is a flap hingeable about an axis parallel to the axis of rotation of the paddle wheel.

6. Transport means as claimed in claim 5 in which the paddle wheel has spokes and the flap is caused to hinge, when the film comes opposite to the pair of rollers, by engagement with each spoke in turn.

7. Transport means as claimed in claim 6 in which the flap is activated by a leaf spring which contacts the back of the flap.

8. Transport means as claimed in claim 6 in which the paddle wheel rotates about a fixed axle and the flap and leaf spring are supported on the axle.

9. Transport means as claimed in claim 1 in which each paddle wheel and its associated pair of rollers are geared together.

10. Transport means as claimed in claim 9 in which the drive for the rollers and the paddle wheel includes a sprocket wheel which engages the upper horizontal run of a sprocket chain which drives all the paddle wheels in synchronism.

References Cited

UNITED STATES PATENTS

| | | | |
|---|---|---|---|
| 1,023,387 | 4/1912 | Meyer | 118—426 |
| 2,004,410 | 6/1935 | Houch et al. | 95—89 |
| 2,031,010 | 2/1936 | Simjian | 95—94 |
| 2,355,278 | 8/1944 | Davis | 118—426 |

NORTON ANSHER, *Primary Examiner.*

FRED L. BRAUN, *Assistant Examiner.*

U.S. Cl. X.R.

95—94; 118—426